(12) United States Patent
Park et al.

(10) Patent No.: US 11,914,879 B2
(45) Date of Patent: Feb. 27, 2024

(54) STORAGE CONTROLLER AND STORAGE SYSTEM COMPRISING THE SAME

(71) Applicant: Samsung Electronics Co., Ltd., Suwon-si (KR)

(72) Inventors: Moon Chan Park, Hwaseong-si (KR); Ji Soo Kim, Seongnam-si (KR); Youn Sung Chu, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 122 days.

(21) Appl. No.: 17/724,857

(22) Filed: Apr. 20, 2022

(65) Prior Publication Data

US 2023/0087260 A1    Mar. 23, 2023

(30) Foreign Application Priority Data

Sep. 23, 2021   (KR) .......................... 10-2021-0125639

(51) Int. Cl.
*G06F 3/06* (2006.01)
(52) U.S. Cl.
CPC ............ *G06F 3/064* (2013.01); *G06F 3/0622* (2013.01); *G06F 3/0656* (2013.01); *G06F 3/0658* (2013.01); *G06F 3/0679* (2013.01)
(58) Field of Classification Search
None
See application file for complete search history.

(56) References Cited

U.S. PATENT DOCUMENTS

| 10,169,253 B2 | 1/2019 | Chen et al. |
| 2015/0143134 A1 | 5/2015 | Hashimoto |
| 2016/0110295 A1 | 4/2016 | Hashimoto |
| 2019/0107965 A1 | 4/2019 | Deval et al. |

(Continued)

FOREIGN PATENT DOCUMENTS

| JP | 2019-205030 A | 11/2019 |
| JP | 2021-043708 A | 3/2021 |

(Continued)

OTHER PUBLICATIONS

Office Action for Korean Application No. 10-2021-0125639 dated Jun. 29, 2022.

(Continued)

*Primary Examiner* — Kevin Verbrugge
(74) *Attorney, Agent, or Firm* — Harness, Dickey & Pierce, P.L.C.

(57) ABSTRACT

A storage controller and a storage system comprising the same are provided. Provided is a device security manager configured to set a first device security zone to allow a first tenant to access first tenant data stored in a non-volatile memory, receive access information from a host device and writing the received access information in a mapping table, wherein the access information includes a first host memory address in which the first tenant data is stored in the host device, a first namespace identifier for identifying the first tenant data stored in the non-volatile memory, a first logic block address corresponding to the first namespace identifier, and an encryption key, encrypt the first tenant data by using the encryption key, and write the encrypted first tenant data in the first device security zone of the non-volatile memory.

18 Claims, 15 Drawing Sheets

(56) References Cited

U.S. PATENT DOCUMENTS

| | | |
|---|---|---|
| 2019/0227921 A1 | 7/2019 | Frolikov |
| 2019/0361605 A1* | 11/2019 | Kanno .................... G06F 3/067 |
| 2020/0136996 A1 | 4/2020 | Li et al. |
| 2020/0159969 A1 | 5/2020 | Shanbhogue et al. |
| 2020/0319913 A1 | 10/2020 | Kumar et al. |
| 2021/0004338 A1 | 1/2021 | Marolia et al. |
| 2021/0117244 A1 | 4/2021 | Herdrich et al. |
| 2021/0149587 A1 | 5/2021 | Lukoshkov et al. |
| 2021/0165571 A1 | 6/2021 | Kanno |

FOREIGN PATENT DOCUMENTS

| | | |
|---|---|---|
| KR | 10-2017-0043373 A | 4/2017 |
| KR | 10-2018-0016679 A | 2/2018 |
| KR | 10-2021-0090505 A | 7/2021 |

OTHER PUBLICATIONS

European Search Report dated Jan. 9, 2023 for corresponding European Application No. 22185786.5.

* cited by examiner

FIG. 4

Mapping Table(219)

| Tenant | Host memory address | NSID | LBA | Key |
|---|---|---|---|---|
| VM 1(Acc_Inf 1) | HMA 1 | NSID 1 | LBA 1 | Key 1 |
| VM 2(Acc_Inf 2) | HMA 2 | NSID 2 | LBA 2 | Key 2 |
| ... | | | | |
| VM N(Acc_Inf N) | HMA N | NSID N | LBA N | Key N |

FIG. 10

Mapping Table(219)

| Tenant | Host memory address | NSID | LBA | Key | Buffer address |
|---|---|---|---|---|---|
| VM 1(Acc_Inf 1) | HMA 1 | NSID 1 | LBA 1 | Key 1 | Buffer address 1 |
| VM 2(Acc_Inf 2) | HMA 2 | NSID 2 | LBA 2 | Key 2 | Buffer address 2 |
| ⋮ | ⋮ | ⋮ | ⋮ | ⋮ | ⋮ |
| VM N(Acc_Inf N) | HMA N | NSID N | LBA N | Key N | Buffer address N |

STORAGE CONTROLLER AND STORAGE SYSTEM COMPRISING THE SAME

CROSS-REFERENCE TO RELATED APPLICATION

This application claims priority from Korean Patent Application No. 10-2021-0125639 filed on Sep. 23, 2021 in the Korean Intellectual Property Office and all the benefits accruing therefrom under 35 U.S.C. 119, the contents of which in its entirety are herein incorporated by reference.

BACKGROUND

Technical Field

The present disclosure relates to a storage controller and a storage system comprising the same.

Description of the Related Art

A storage system includes a host device and a storage device, which may exchange data with each other through various interfaces. A single Root I/O Virtualization (SR-IOV) allows a plurality of virtual machines (VM) in the host device to access the storage device through one assignable device interface (ADI). The single root I/O virtualization may be published by a Peripheral Component Interconnect Special Interest Group (PCI-SIG).

In a multi-tenant virtualization environment such as a cloud environment, a virtualization-based trusted execution environment (TEE) may be provided. The virtualization-based trusted execution environment is capable of separating and protecting data for each tenant at a side of the host device, for example, through techniques such as, Multi Key Total Memory Encryption (MKTME) of Intel Corporation, Secure Encrypted Virtualization (SEV) of AMD Company, or Trust Zone of ARM Company. However, for security attacks that are performed during access from the host device to the storage device, isolation and encryption of data for each of multiple tenants may be required or desired.

SUMMARY

Example embodiments provide a storage controller having improved reliability in security.

Example embodiments provide a storage device having improved reliability in security.

Other example embodiments provide a host device having improved reliability in security.

Example embodiments are not limited to those mentioned above and additional example embodiments of the present disclosure, which are not mentioned herein, will be clearly understood by those skilled in the art from the following description of the present disclosure.

According to an example embodiment of the inventive concepts, there is provided a storage controller comprising a device security manager configured to set a first device security zone to allow a first tenant to access first tenant data stored in a non-volatile memory, receive access information from a host device and writing the received access information in a mapping table, wherein the access information includes a first host memory address in which the first tenant data is stored in the host device, a first namespace identifier for identifying the first tenant data stored in the non-volatile memory, a first logic block address corresponding to the first namespace identifier, and an encryption key, encrypt the first tenant data by using the encryption key, and write the encrypted first tenant data in the first device security zone of the non-volatile memory.

According to an example embodiment of the inventive concepts, there is provided a storage device comprising, a non-volatile memory storing first tenant data, and a storage controller configured to set a first device security zone in the non-volatile memory to allow a first tenant to access the first tenant data, receive access information from a host device and writing the received access information in a mapping table, wherein the access information includes a first host memory address in which the first tenant data is stored in the host device, a first namespace identifier for identifying the first tenant data stored in the non-volatile memory, and a first logic block address corresponding to the first namespace identifier, and send an access acknowledgement to the host device when the host device performs an access request corresponding to the access information stored in the mapping table.

According to an example embodiment of the inventive concepts, there is provided a host device comprising, a host memory storing first tenant data, a host security manager is configured to set a first device security zone in the host memory to allow a first tenant to access the first tenant data, and a host controller configured to control access of the first tenant to access the host memory, wherein the host security manager is further configured to send access information to a storage device, the access information includes a first host memory address in which the first tenant data is stored in the host memory, a first namespace identifier for identifying the first tenant data stored in the non-volatile memory included in the storage device, and a first logic block address corresponding to the first namespace identifier, and the host controller is further configured to receive an access acknowledgement from the storage device in response to sending an access request corresponding to the access information to the storage device.

BRIEF DESCRIPTION OF THE DRAWINGS

The above and other example embodiments and features of the present disclosure will become more apparent by describing in detail example embodiments with reference to the attached drawings, in which:

FIG. 4 is an example table illustrating a mapping table according to some example embodiments.

FIG. 10 is an example table illustrating another mapping table according to some example embodiments.

DETAILED DESCRIPTION OF THE DISCLOSURE

Figure 1:
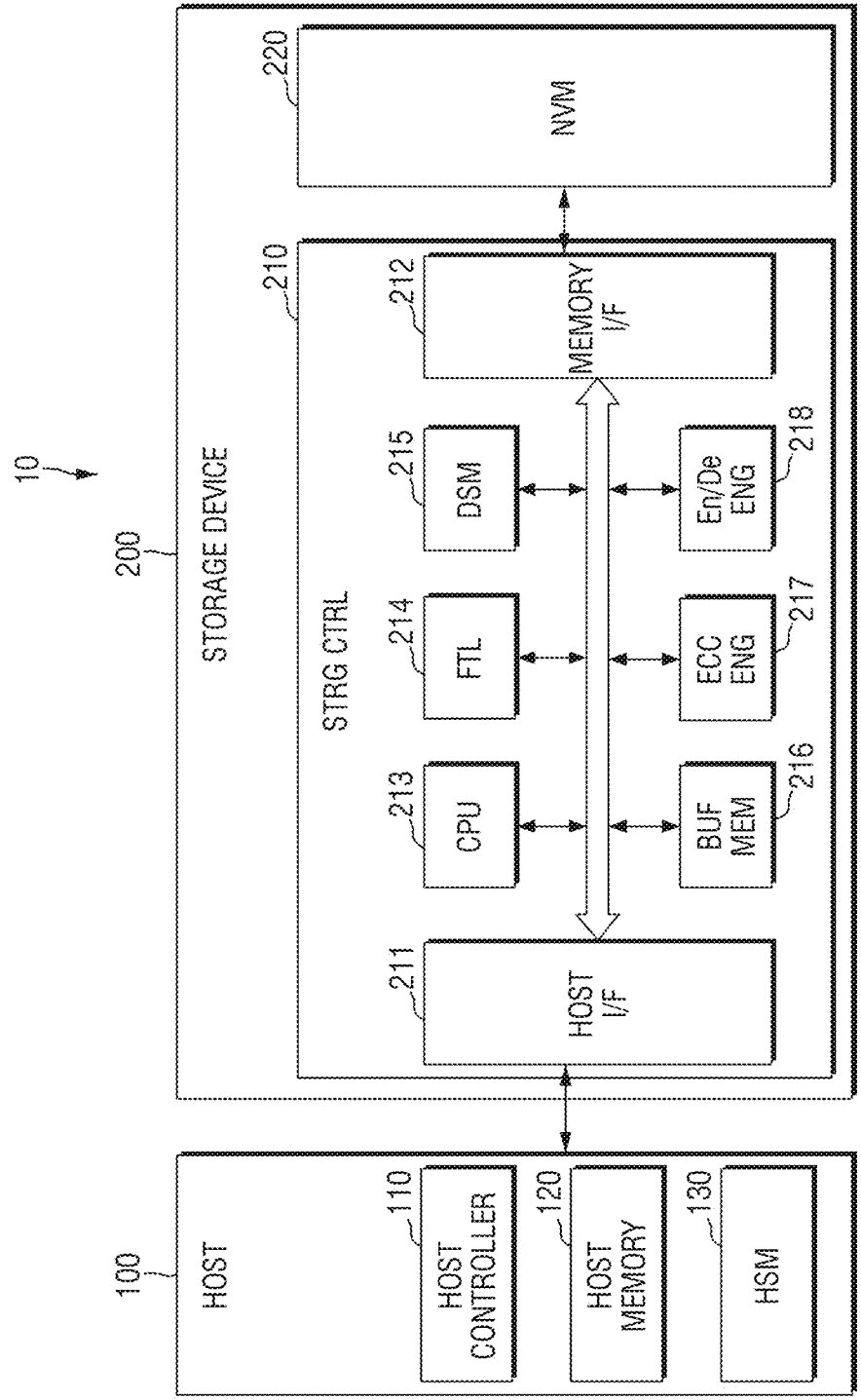
FIG. 1 is an example block diagram illustrating a storage system according to some embodiments of the present disclosure.

FIG. 1 is an example block diagram illustrating a storage system according to some example embodiments of the present disclosure.

Referring to FIG. 1, a storage system 10 may include a host device 100 and a storage device 200. Also, the storage device 200 may include a storage controller 210 and a non-volatile memory (NVM) 220.

In accordance with an example embodiment of the present disclosure, the host device 100 may include a host controller 110 and a host device 120. The host memory 120 may serve as a buffer memory for temporarily storing data to be transmitted to the storage device 200 or data transmitted from the storage device 200.

The storage device 200 may include storage media for storing data in accordance with a request from the host device 100. As an example, the storage device 200 may include at least one of a solid state drive (SSD), an embedded memory, or a detachable external memory.

When the storage device 200 is the SSD, the storage device 200 may be a device that complies with a non-volatile memory express (NVMe) standard. When the storage device 20 is the embedded memory or the external memory, the storage device 200 may be a device that complies with a universal flash storage (UFS) standard or an embedded multi-media card (eMMC) standard. Each of the host device 100 and the storage device 200 may generate and transmit packets according to a standard protocol that is employed.

When the non-volatile memory 220 of the storage device 200 includes a flash memory, the flash memory may include a 2D NAND memory array or a 3D (or vertical) NAND (VNAND) memory array. As another example, the storage device 200 may include other various types of non-volatile memories. For example, a magnetic random access memory (MRAM), a spin-transfer torque MRAM, a Conductive Bridging RAM (CBRAM), a Ferroelectric RAM (FeRAM), a Phase RAM (PRAM), a Resistive RAM and other various types of memories may be applied to the storage device 200.

In accordance with one embodiment, each of the host controller 110 and the host memory 120 may be implemented as a separate semiconductor chip. Alternatively, in some example embodiments, the host controller 110 and the host memory 120 may be integrated into the same semiconductor chip. As an example, the host controller 110 may be any of a plurality of modules provided in an application processor, and the application processor may be implemented as a system on chip (SoC). In addition, the host memory 120 may be an embedded memory provided in the application processor, or may be a non-volatile memory or memory module disposed outside the application processor.

The host controller 110 may store data (e.g., write data) of a buffer region of the host memory 120 in the non-volatile memory 220, or may manage an operation of storing data (e.g., read data) of the non-volatile memory 220 in the buffer region.

A host security manager 130 may designate a host security zone in the host memory 120. For example, a first host security zone that is allowed to be accessed by only a first tenant may be set in the host memory 120. Also, a second host security zone different from the first security zone, which is allowed to be accessed by only a second tenant different from the first tenant, may be set in the host memory 120. Without limitation to this example, the host security manager 130 may set three or more different security zones that are allowed to be accessed by three or more tenants, respectively, may be set in some regions of the host memory 120.

The storage controller 210 may include a host interface 211, a memory interface 212 and a central processing unit (CPU) 213. The storage controller 210 may further include a flash translation layer (FTL) 214, a device security manager 215, a buffer memory 216, an error correction code (ECC) engine 217 and an encryption/description engine 218. The storage controller 210 may further include a working memory (not shown) into which the flash translation layer (FTL) 214 is loaded, and the CPU 213 may control data write and read operations for the non-volatile memory 220 by executing the flash translation layer.

The host interface 211 may transmit and receive packets to and from the host device 100. The packet transmitted from the host device 100 to the host interface 211 may include a command or data to be written in the non-volatile memory 220, and the packet transmitted from the host interface 211 to the host device 100 may include a response to the command or data read from the non-volatile memory 220. The memory interface 212 may transmit the data to be written in the non-volatile memory 220 to the non-volatile memory 220 or may receive the data read from the non-volatile memory 220. Such a memory interface 212 may be implemented to comply with standard regulations such as Toggle or Open NAND Flash Interface (ONFI).

The flash translation layer 214 may perform various functions, such as address mapping, wear-leveling and garbage collection. The address mapping operation is an operation of changing a logical address received from the host device 100 to a physical address used to actually store data in the non-volatile memory 220. Wear-leveling is a technique for preventing excessive degradation of a specific block by allowing blocks in the non-volatile memory 220 to be used uniformly, and may exemplarily be implemented through firmware technology for balancing erase counts of physical blocks. Garbage collection is a technique for making sure of the available capacity in the non-volatile memory 220 by copying valid data of a block to a new block and then erasing the existing block.

The ECC engine 217 may perform error detection and correction functions for the read data read from the non-volatile memory 220. In more detail, the ECC engine 217 may generate parity bits for write data to be written in the non-volatile memory 220, and the generated parity bits may be stored in the non-volatile memory 220 together with the write data. When reading the data from the non-volatile memory 220, the ECC engine 217 may correct an error of the read data by using the parity bits read from the non-volatile memory 220 together with the read data, and then may output the error-corrected read data.

The device security manager 215 may designate a device security zone in the buffer memory 216 and/or the non-volatile memory 220. For example, the device security manager 215 may set a first device security zone allowed to be accessed by only the first tenant in the buffer memory 216 and/or the non-volatile memory 220. Further, the device security manager 215 may set a second device security zone different from the first device security zone, which is allowed to be accessed by only a second tenant different from the first tenant, in the buffer memory 216 and/or the non-volatile memory 220. As an example, the device security manager 215 may set three or more different security zones, which are allowed to be accessed by only three or more tenants, respectively, may be set in some regions of the buffer memory 216 and/or the non-volatile memory 220.

The buffer memory 216 may temporarily store data to be written in the non-volatile memory 220 or data to be read from the non-volatile memory 220. In addition, the buffer memory 216 may be provided in the storage controller 210 but may be disposed outside the storage controller 210. The buffer memory 216 may be, for example, a dynamic random access memory (DRAM).

The encryption/decryption engine 218 may perform at least one of an encryption operation or a decryption operation for data input to the storage controller 210. For example, the encryption/decryption engine 218 may perform at least one of an encryption operation or a decryption operation for data input to the storage controller 210 by using a symmetric-key algorithm.

In an environment where a plurality of tenants use one storage system 10, a security zone for each of the plurality of tenants may be set. For example, a first host security zone accessible only to the first tenant may be set in the host memory 120, and the first device security zone may be set in the storage device 200. For another example, a second host security zone accessible only to the second tenant may be set in the host memory 120, and a second device security zone may be set in the storage device 200.

At this time, an access attempt from the first tenant to the second device security zone may be made. Alternatively, an access attempt from the second tenant to the first device security zone may be made. This is described with reference to FIG. 2.

Figure 2:
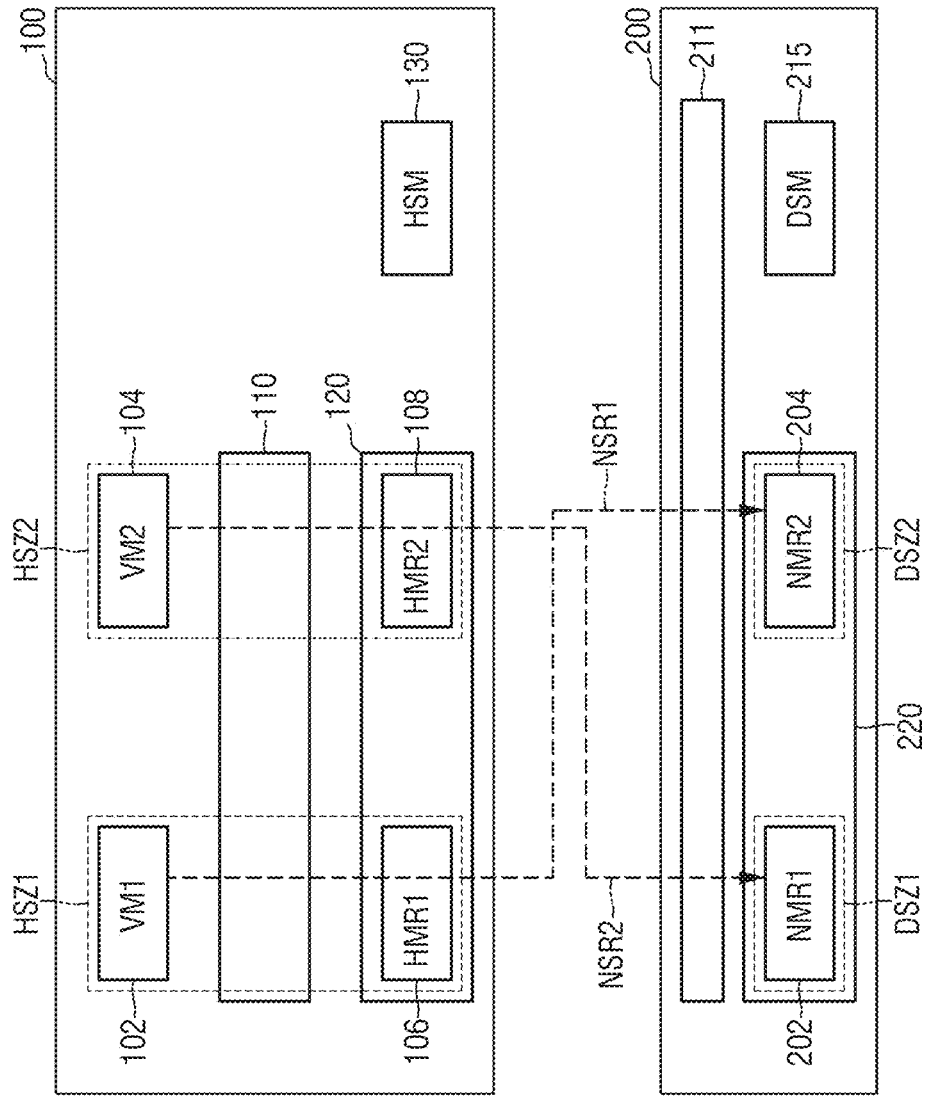
FIG. 2 is a block diagram illustrating an example of a security attack of a host device against a storage device.

FIG. 2 is a block diagram illustrating an example of a security attack of a host device against a storage device.

Referring to FIG. 2, an Assignable Device Interface (ADI) (e.g., host interface 211) may be assigned to each of a first tenant 102 (e.g., Virtual Machine 1 (VM1) and a second tenant 102 (e.g., VM2). The ADI may be, for example, an input/output Peripheral Component Inter-connect (PCI) Express (PCIe). The number of multiple tenants is not limited to this drawing.

The host security manager 130 may designate host security zones (e.g., first device security zone HSZ 1 and second device security zone HSZ 2) in the host memory 120. The number of host security zones set by the host security manager 130 may vary depending on the number of multiple tenants, without being limited to this drawing.

For example, the first device security zone HSZ 1 allowed to be accessed by only the first tenant VM 1 may be set in the host memory 120. In addition, the second device security zone HSZ 2 which is allowed to be accessed by only the second tenant VM 2 different from the first tenant VM 1 and is different from the first device security zone HSZ 1 may be set in the host memory 120.

That is, the first tenant VM 1 is accessible only to data of a first host memory region 106 in the host memory 120 through the host controller 110. For example, the first tenant VM 1 may access only first tenant data stored in the first host memory region 106 inside the host memory 120 through the host controller 110.

In addition, the second tenant VM 2 is accessible only to data of a second host memory region 108 in the host memory 120 through the host controller 110. For example, the second tenant VM 2 may access only second tenant data stored in the second host memory region 108 inside the host memory 120 through the host controller 110.

The device security manager 215 may designate device security zones (e.g., first device security zone DSZ 1 and second device security zone DSZ 2) in the non-volatile memory 220. The number of device security zones set by the device security manager 215 may vary depending on the number of multiple tenants, without being limited to this drawing.

For example, the first device security zone DSZ 1 allowed to be accessed by only the first tenant VM 1 may be set in the non-volatile memory 220. In addition, the second device security zone DSZ 2 which is allowed to be accessed by only the second tenant VM 2 different from the first tenant VM 1 and is different from the first device security zone DSZ 1 may be set in the host memory 120.

That is, the first tenant VM 1 is accessible only to data of a first non-volatile memory region NMR 1 in the non-volatile memory 220 through the host interface 211. For example, the first tenant VM 1 may access only the first tenant data stored in the first non-volatile memory region NMR 1 of the non-volatile memory 220 through the host interface 211.

In addition, the second tenant VM 2 is accessible only to the data of the second non-volatile memory region NMR 2 in the non-volatile memory 220 through the host interface 211. For example, the second tenant VM 2 may access only second tenant data stored in the second non-volatile memory region NMR 2 in the non-volatile memory 220 through the host interface 211.

However, as a security attack from the first tenant VM 1 is attempted, the first tenant VM 1 may attempt access the data of the second non-volatile memory region NMR 2 of the second device security zone DSZ 2 through a first non-security route NSR 1. Alternatively, as a security attack from the second tenant VM 2 is attempted, the second tenant VM 2 may attempt access the data of the first non-volatile memory region NMR 1 of the first device security zone DSZ 1 through a second non-security route NSR 2.

Therefore, isolation for each of the plurality of tenants and protection of data for the non-volatile memory 220 of each of the plurality of tenants is required or desired. Through the operation of the storage system according to some example embodiments, isolation for each of the plurality of tenants and protection of the data for the non-volatile memory 220 of each of the plurality of tenants may be performed and is described in detail below.

Figure 3:
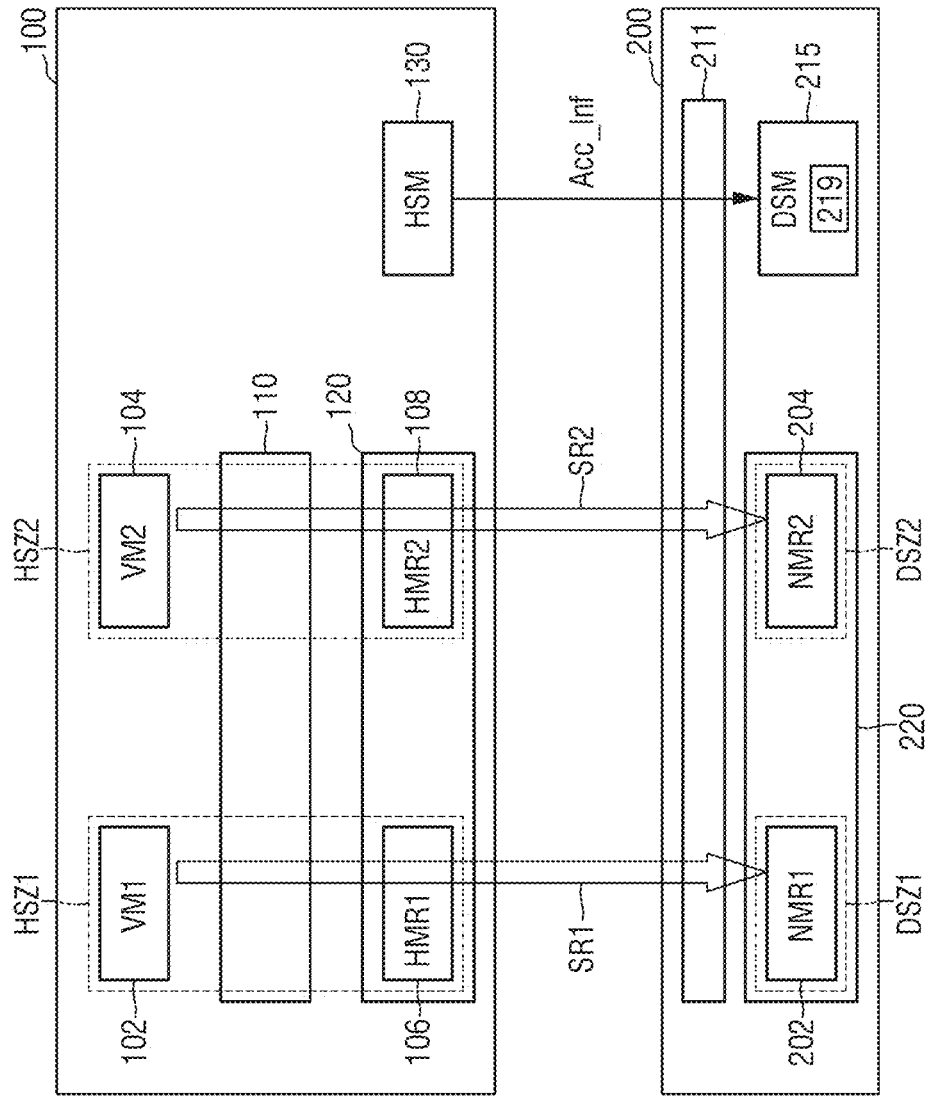
FIG. 3 is an example block diagram illustrating an operation of a storage system according to some example embodiments.

FIG. 3 is an example block diagram illustrating an operation of a storage system according to some example embodiments.

Referring to FIG. 3, the host security manager 130 may send access information Acc_Inf to the device security manager 215 after ADI assignment is completed between the host security manager 130 and the device security manager 215.

The ADI assignment may be an operation that each of a plurality of tenants (first tenant VM 1 and second tenant VM 2) is assigned to use some region of the ADI (e.g., host interface 211) (e.g. to use some resources of the host interface 211).

The access information Acc_Inf may be different for each of the plurality of tenants. That is, the access information Acc_Inf on the first tenant VM 1 and the access information Acc_Inf on the second tenant VM 2 may be different from each other.

The device security manager 215 that has received the access information Acc_Inf on each of the plurality of tenants from the host security manager 130 may write the access information Acc_Inf in a mapping table 219.

The mapping table 219 may be stored in a buffer inside the device security manager 215. Alternatively, the mapping table 219 may be stored in a buffer (e.g., buffer memory 216) outside the device security manager 215.

The access information Acc_Inf and the mapping table 219 are described in detail with reference to FIG. 4.

FIG. 4 is an example table illustrating a mapping table according to some example embodiments.

Referring to FIGS. 3 and 4, access information Acc_Inf according to each of tenants (e.g., VM 1 to VM N, where N is a natural number greater than 1) is stored in the mapping table 219.

For example, first access information Acc_Inf 1 on the first tenant VM 1 may include a first host memory address HMA 1, a first namespace identifier NSID 1, a first logic block address LBA 1 and a first security key Key 1, which correspond to the first host memory region 106. Second access information Acc_Inf 2 on the second tenant VM 2 may include a second host memory address HMA 2, a second namespace identifier NSID 2, a second logic block address LBA 2 and a second security key Key 2, which correspond to the second host memory region 108. In addition, Nth access information Acc_Inf N on an Nth tenant VM N may include an Nth host memory address HMA N, an Nth namespace identifier NSID N, an Nth logic block address LBA N and an Nth security key Key N, which correspond to an Nth host memory region HMR N.

Hereinafter, the first access information Acc_Inf 1 is described, and its description may be applied to the other access information (for example, second access information Acc_Inf 2 to Nth access information Acc_Inf N).

The first host memory address HMA 1 may be a memory address corresponding to the first host memory region 106 included in the first device security zone HSZ 1 inside the host memory 120. The first namespace identifier may be an identifier corresponding to the first non-volatile memory region NMR 1 included in the first device security zone DSZ 1. The first logic block address LBA 1 may be a logical address for allowing the host device 100 to access the first non-volatile memory region NMR 1 included in the first device security zone DSZ 1. The first security key Key 1 may be an encryption key used to perform encryption and/or decryption for the first tenant data.

For reference, the first security key Key 1 may be received from the host security manager 130 or may be generated by the device security manager 215.

An entity for performing encryption and/or decryption for the first tenant data by using the first security key Key 1 may be the device security manager 215 or the encryption/decryption engine 218.

Each of the plurality of access information Acc_Inf 1 to Acc_Inf N written in the mapping table 219 may be modified by only the device security manager 215.

The device security manager 215 that has written the plurality of tenant-specific access information Acc_Inf received from the host security manager 130 in the mapping table 219 determines whether to approve an access request from the host device 100 by using the mapping table 219.

In more detail, when attempting to access the storage device 200, the host controller 110 sends the access information, which includes information of a tenant who attempts to access the storage device 200, to the storage device 200. At this time, a host memory address, a namespace identifier and a logic block address for each tenant may be included in the information of the tenant.

That is, the device security manager 215 of the storage device 200 extracts the host memory address, the namespace identifier and the logic block address in the access information received from the host controller 110, compares the extracted ones with those stored in the mapping table 219, and approves access from the host device 100 to the storage device 200 when it is determined that the extracted ones are the same as those stored in the mapping table 219.

After extracting the host memory address, the namespace identifier and the logic block address in the access information received from the host controller 110 and comparing the extracted ones with those stored in the mapping table 219 to determine whether the extracted ones are the same as those stored in the mapping table 219, when it is determined that the extracted ones are the same as those stored in the mapping table 219, an entity for approving access from the host device 100 to the storage device 200 may be the CPU 213.

For example, if the first tenant VM 1 reads the first tenant data stored in the first non-volatile memory region NMR 1 of the storage device 200, at this time (or in response), the host controller 110 sends the first access information Acc_Inf 1 related to the first tenant VM 1 to the storage device 200. Afterwards, when it is determined that the host memory address, the namespace identifier and the logic block address, which exist in the first access information Acc_Inf, are the same as the first host memory address HMA 1, the first namespace identifier NSID 1 and the first logic block address LBA 1, which are stored in the mapping table 219, the device security manager 215 in the storage device 200 determines that the corresponding operation is not the security attack performed from the first tenant VM 1, and approves the read operation of the first tenant VM 1. Afterwards, the device security manager 215 may decode the first tenant data stored in the first non-volatile memory region NMR 1 by using the first security key Key 1 to transmit the decoded first tenant data to the first host memory region 106 corresponding to the first host memory address HMA 1 of the host memory 120. The first tenant VM 1 may complete the read operation for the first tenant data transmitted to the first host memory region 106.

For another example, if the first tenant VM 1 writes the first tenant data in the first non-volatile memory region NMR 1 of the storage device 200, at this time (or in response), the host controller 110 sends the first access information Acc_Inf 1 related to the first tenant VM 1 and the first tenant data to the storage device 200. Afterwards, when it is determined that the host memory address, the namespace identifier and the logic block address, which exist in the first access information Acc_Inf 1, are the same as the first host memory address HMA 1, the first namespace identifier NSID 1 and the first logic block address LBA 1, which are stored in the mapping table 219, the device security manager 215 in the storage device 200 determines that the corresponding operation is not the security attack performed from the first tenant VM 1, and approves the write operation of the first tenant VM 1. Afterwards, the device security manager 215 may encrypt and write the first tenant data in the first non-volatile memory region NMR 1 by using the first security key Key 1. The first tenant VM 1 may complete the write operation for the first tenant data.

Referring back to FIG. 3, as described above, the storage device 200 according to some example embodiments extracts the host memory address, the namespace identifier and the logic block address, which are included in the access information Acc_Inf received from the host device 100, compares the extracted ones with information of the mapping table 219 in which information on each of the plurality of tenants VM 1 to VM N is stored, to determine whether the extracted ones are the same as the information of the mapping table 219, and then determines whether to approve the access from the host device 100, thereby ensuring isolation of data for each of the plurality of tenants VM 1 to VM N and improving security.

For example, the first tenant VM 1 may access only the first tenant data of the first non-volatile memory region NMR 1, which is stored in the first device security zone DSZ 1, through a first security route SR1, and the second tenant VM 2 may access only the second tenant data of the second non-volatile memory region NMR 2, which is stored in the second device security zone DSZ 2, through a second security route SR2.

The operation of the storage system 10 according to some example embodiments are described with reference to a ladder diagram of FIG. 5.

Figure 5:
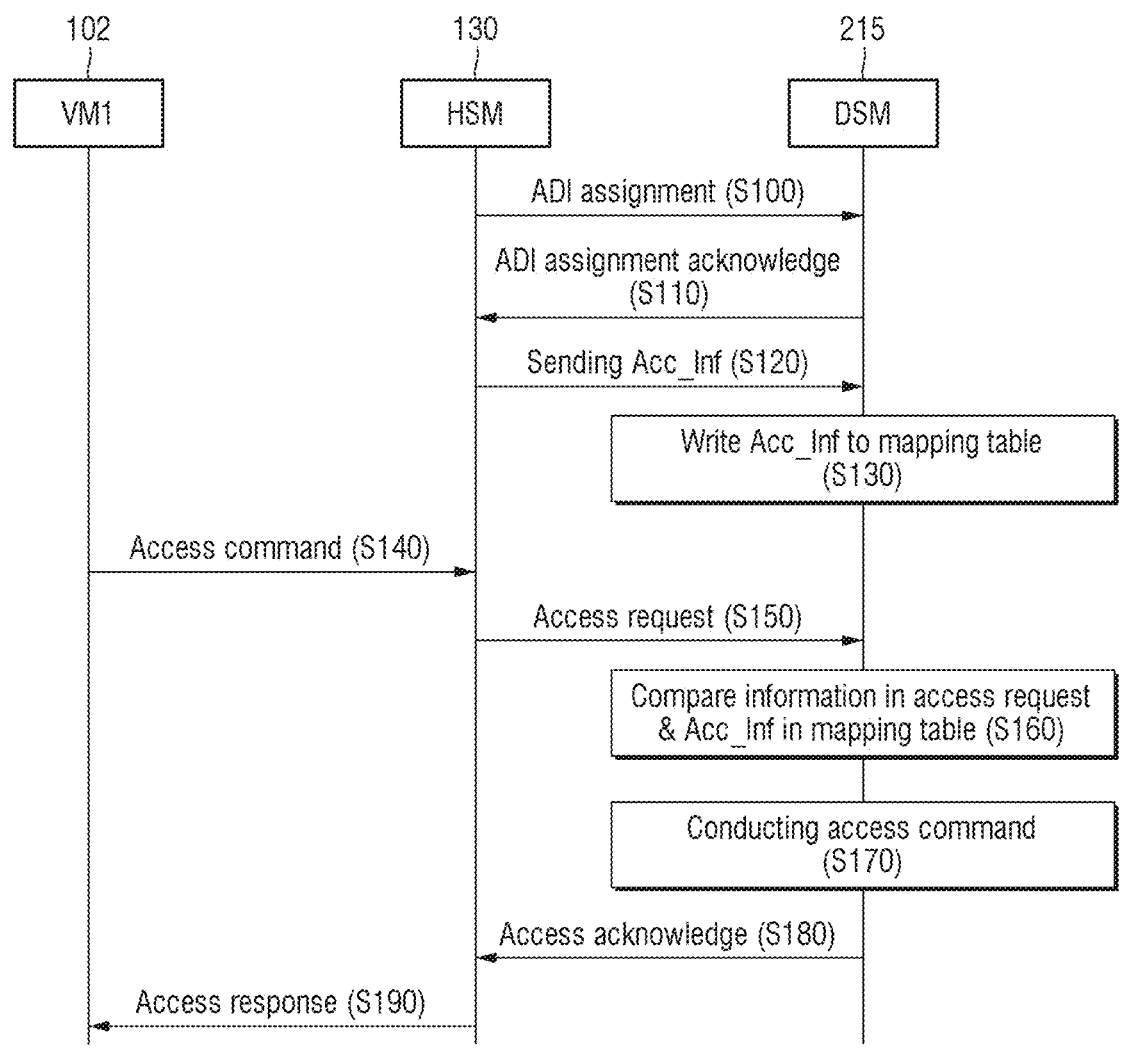
FIG. 5 is an example ladder diagram illustrating an operation of a storage system according to some example embodiments.

FIG. 5 is an example ladder diagram illustrating an operation of a storage system according to some example embodiments where the first tenant VM 1 has access. The description of the first tenant VM 1 may be applied to that of the second tenant VM 2 to the Nth tenant VM N.

Referring to FIGS. 3 to 5, the host security manager 130 performs an ADI (e.g., host interface 211) assignment request for each of the plurality of tenants VM 1 to VM N to the device security manager 215 (S100).

Afterwards, the device security manager 215 sends an ADI (e.g., host interface 211) assignment acknowledgement for each of the plurality of tenants VM 1 to VM N to the host security manager 130 (S110).

Afterwards, the host security manager 130 sends the access information Acc_Inf 1 to Acc_Inf N on each of the plurality of tenants VM 1 to VM N to the device security manager 215 (S120). The access information Acc_Inf 1 to Acc_Inf may be host memory addresses HMA 1 to HMA N, namespace identifiers NSID 1 to NSID N and logic block addresses LBA 1 to LBA N for each of the plurality of tenants VM 1 to VM N, respectively.

The device security manager 215 writes the access information Acc_Inf 1 to Acc_Inf N received from the host security manager 130 in the mapping table 219 (S130). At this time, the device security manager 215 may together store encryption keys Key 1 to Key N used for encryption and/or decryption for data of each of the plurality of tenants VM 1 to VM N. The information written in the mapping table 219 may be modified by only the device security manager 215.

Afterwards, the host security manager 130 sends an access command to the host security manager 130 for access to the storage device 200 (S140).

The host security manager 130 sends, to the device security manager 215, an access request including the access information Acc_Inf on the first tenant VM 1 (S150).

Afterwards, the device security manager 215 extracts the host memory address, the namespace identifier and the logic block address for the access request received from the host security manager 130 and compares the extracted host memory address, namespace identifier and logic block address with the first host memory address HMA 1, the first namespace identifier NSID 1 and the first logic block address LBA 1 of the first access information Acc_Inf 1 stored in the mapping table 219 (S160).

At this time, when it is determined that the host memory address, the namespace identifier and the logic block address, which are received from the host security manager 130, are the same as the first host memory address HMA 1, the first namespace identifier NSID 1 and the first logic block address LBA 1 of the first access information Acc_Inf 1 stored in the mapping table 219, the device security manager 215 performs an access command operation for the storage device 200 of the first tenant VM 1 (S170). The access command of the first tenant VM 1 may be, for example, a read operation of the first tenant data from the storage device 200 or a write operation of the first tenant data in the storage device 200.

After performing the access command operation of the first tenant VM 1 in the storage device 200, the device security manager 215 sends an access acknowledgment command to the host security manager 130 (S180).

Afterwards, the host security manager 130 sends an access response to the access command to the first tenant VM 1 (S190).

The operation of the storage system 10 according to some example embodiments are described with reference to a flow chart of FIG. 6.

Figure 6:
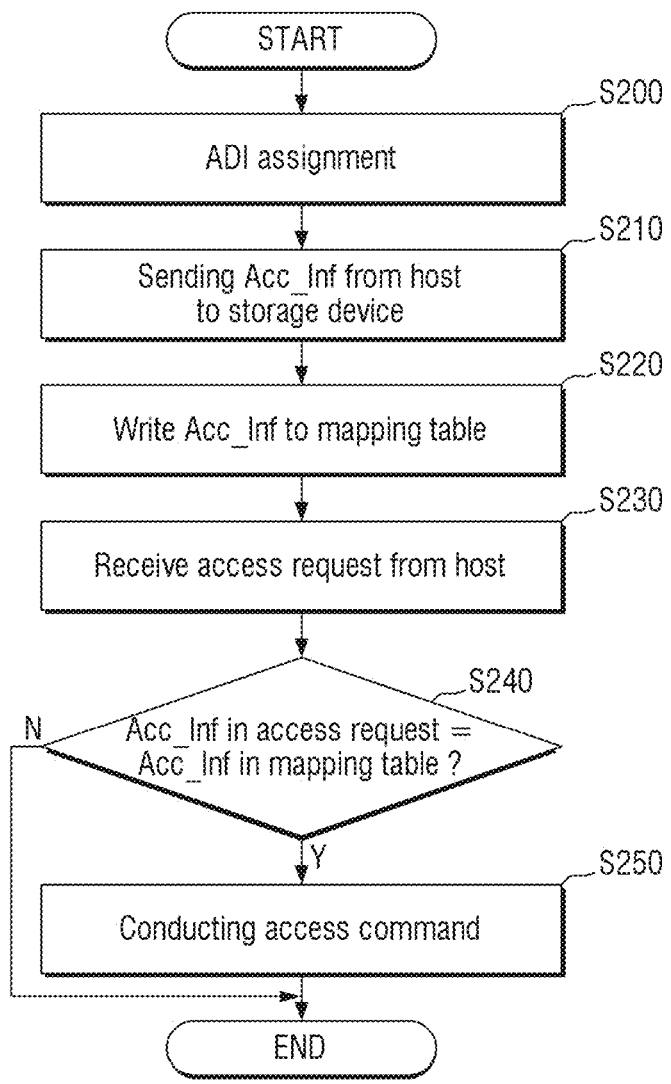
FIG. 6 is an example flow chart illustrating an operation of a storage system according to some example embodiments.

FIG. 6 is an example flow chart illustrating an operation of a storage system according to some example embodiments.

Referring to FIGS. 3, 4 and 6, the host security manager 130 performs an ADI (e.g., host interface 211) assignment request for each of the plurality of tenants VM 1 to VM N to the device security manager 215. Then, the device security manager 215 sends an ADI (e.g., host interface 211) assignment acknowledgement to each of the plurality of tenants VM 1 to VM N to the host security manager 130, thereby terminating the ADI assignment for each of the plurality of tenants VM 1 to VM N (S200).

Afterwards, the host security manager 130 sends the access information Acc_Inf 1 to Acc_Inf N for each of the plurality of tenants VM 1 to VM N to the device security manager 215 (S210). The access information Acc_Inf 1 to Acc_Inf N may be host memory addresses HMA 1 to HMA N, namespace identifiers NSID 1 to NSID N and logic block addresses LBA 1 to LBA N for each of the plurality of tenants VM 1 to VM N, respectively.

The device security manager 215 writes the access information Acc_Inf 1 to Acc_Inf received from the host security manager 130 in the mapping table 219 (S220). At this time, the device security manager 215 may store encryption keys Key 1 to Key N used for encryption and/or decryption for data of each of the plurality of tenants VM 1 to VM N. The information written in the mapping table 219 may be modified by only the device security manager 215.

Afterwards, the device security manager 215 receives an access request including the access information Acc_Inf for a tenant who has requested the access command, from the host security manager 130 (S230).

Afterwards, the device security manager 215 extracts a host memory address, a namespace identifier and a logic block address with respect to the access request received from the host security manager 130, compares the extracted ones with those of the access information stored in the mapping table 219 (S240).

When it is determined that the host memory address, the namespace identifier and the logic block address, which are included in the access request received from the host security manager 130, are different from those stored in the mapping table 219 (N), the device security manager 215 determines this case as a security attack from the tenant who has requested the access command and does not perform an operation for the access command.

Otherwise, when it is determined that the host memory address, the namespace identifier and the logic block address, which are included in the access request received from the host security manager 130, are the same as those stored in the mapping table 219 (Y), the device security manager 215 performs the access command operation (S250).

Figure 7:
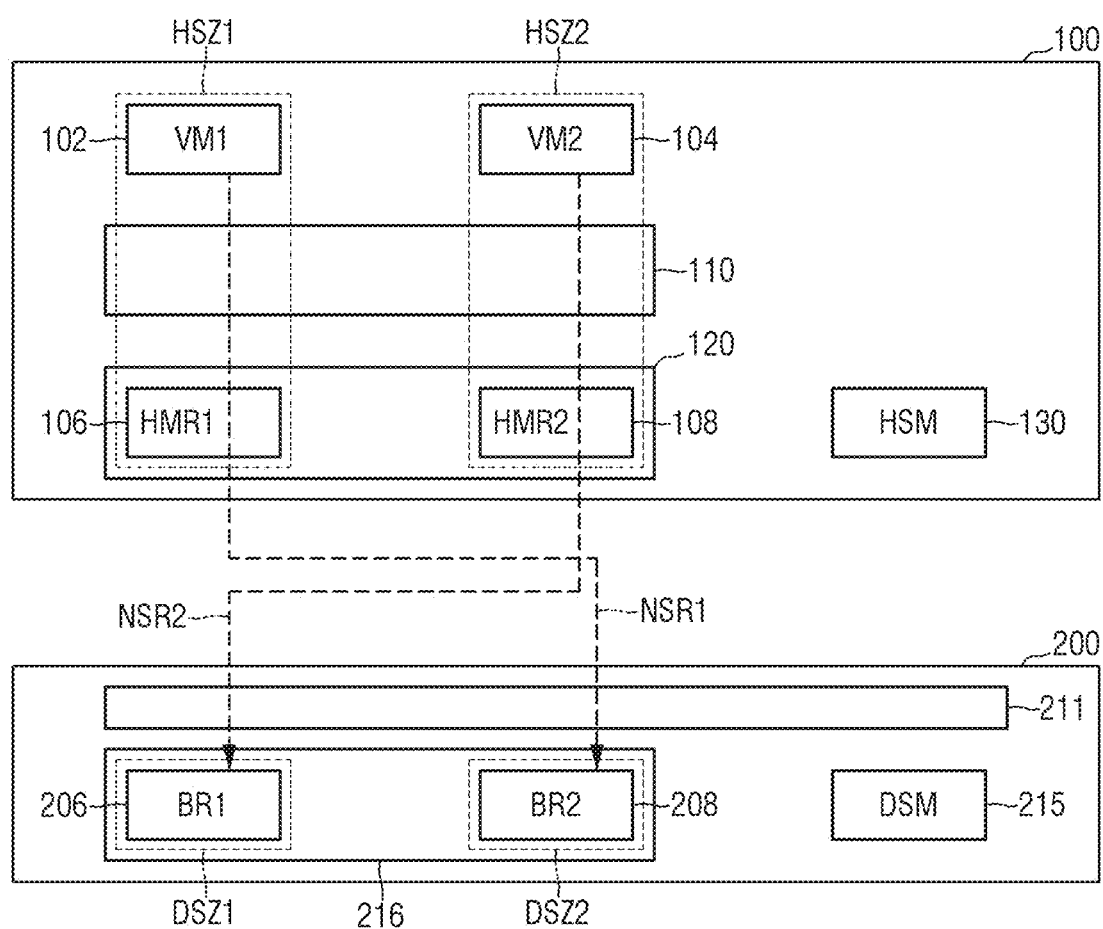
FIG. 7 is a block diagram illustrating another example of a security attack of a host device against a storage device.

FIG. 7 is a block diagram illustrating another example of a security attack of a host device against a storage device. For conciseness of description, a repeated description of FIG. 2 is omitted, and the following description is based on a difference from FIG. 2.

Referring to FIG. 7, as a security attack from the first tenant VM 1 is attempted, the first tenant VM 1 may attempt to access the data of the second buffer region BR 2 of the second device security zone DSZ 2 through the first non-security route NSR 1. Alternatively, as a security attack from the second tenant VM 2 is attempted, the second tenant VM 2 may attempt to access data of a first buffer region BR 1 of the first device security zone DSZ 1 through the second non-security route NSR 2.

Therefore, isolation for each of the plurality of tenants and protection of data for the buffer memory 216 of each of the plurality of tenants is required or desired. Through the operation of the storage system according to some example embodiments, isolation of each of the plurality of tenants and protection of the data for the buffer memory 216 of each of the plurality of tenants may be performed and is described in detail below.

Figure 8:
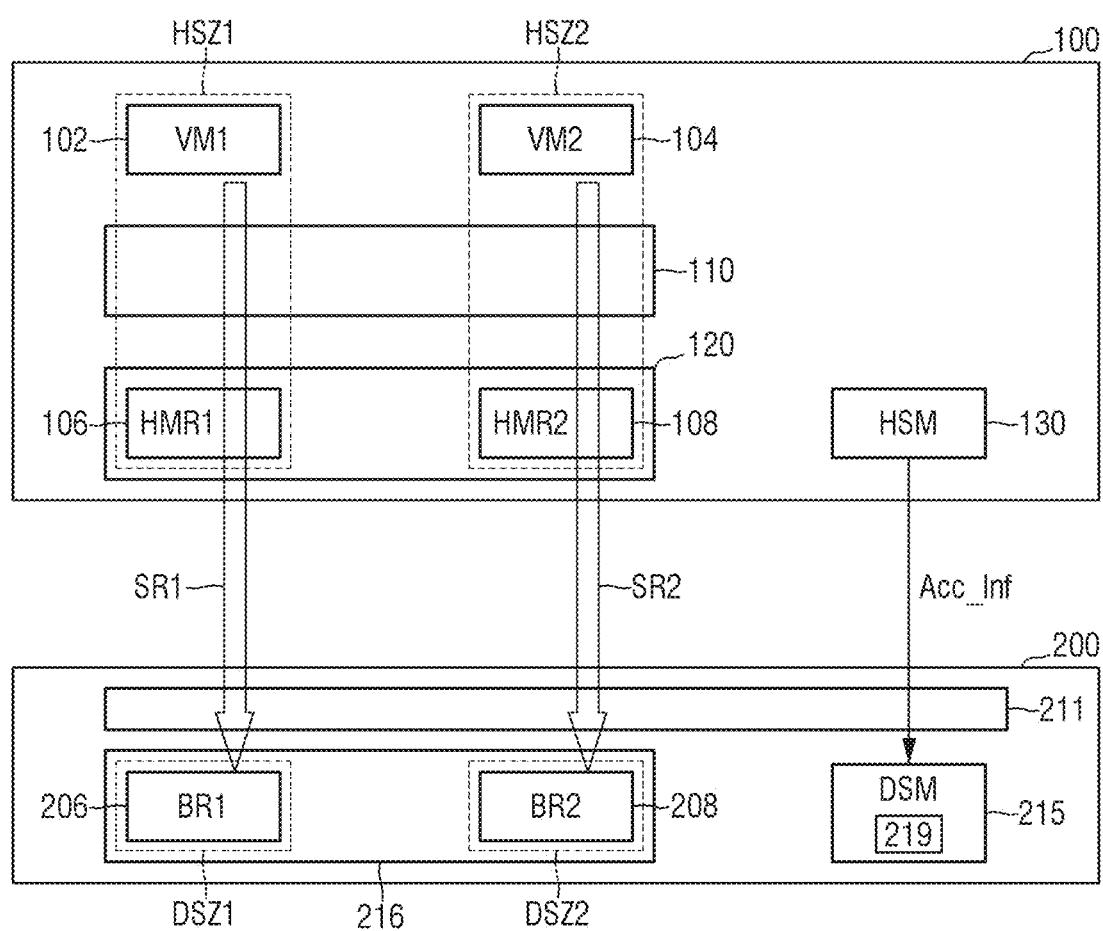
FIGS. 8 and 9 are example block diagrams illustrating another operation of a storage system according to some example embodiments.
Figure 9:
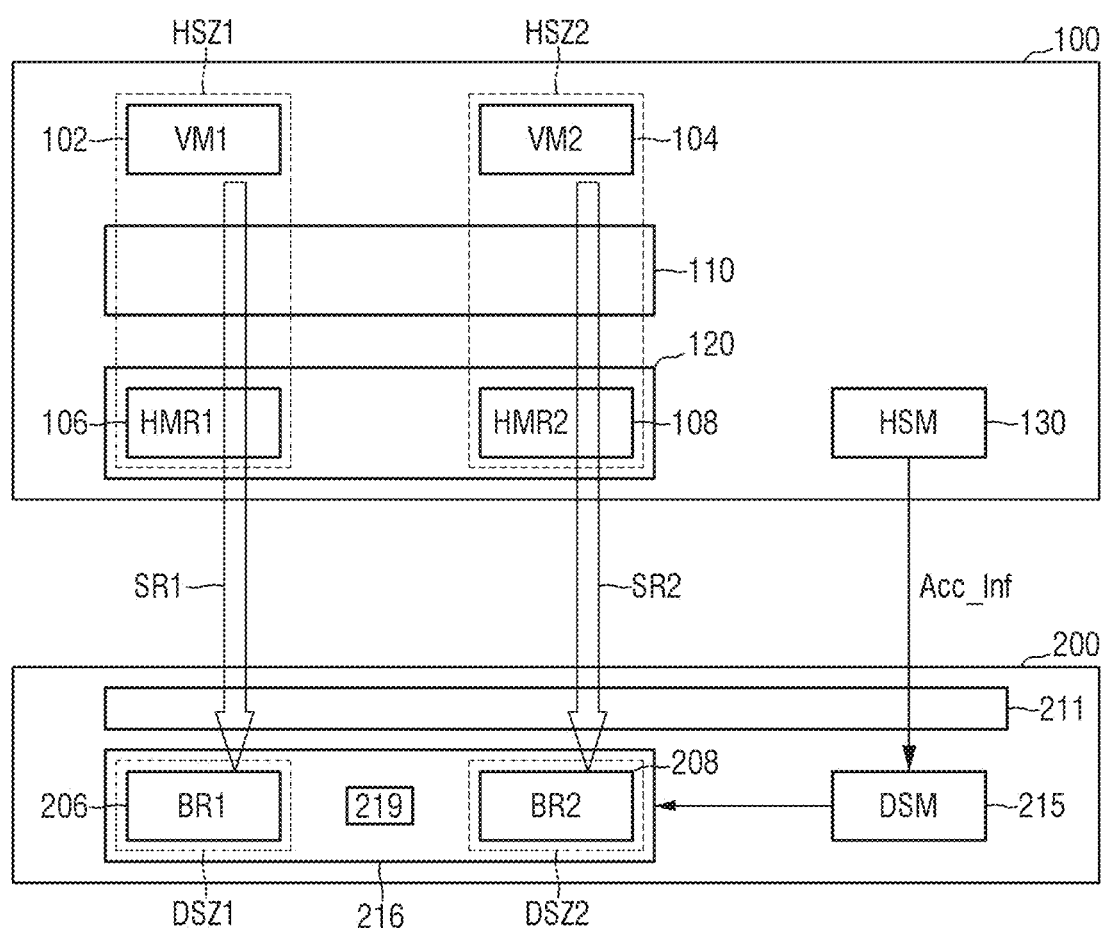

FIGS. 8 and 9 are example block diagrams illustrating another operation of a storage system according to some example embodiments. FIG. 10 is an example table illustrating another mapping table according to some example embodiments.

Referring to FIGS. 8 to 10, the host security manager 130 may send the access information Acc_Inf to the device security manager 215 after the ADI assignment is completed between the host security manager 130 and the device security manager 215.

The access information Acc_Inf may be different for each of the plurality of tenants. That is, the access information Acc_Inf on the first tenant VM 1 and the access information Acc_Inf on the second tenant VM 2 may be different from each other.

The device security manager 215 that has received the access information Acc_Inf for each of the plurality of tenants from the host security manager 130 may write the access information Acc_Inf in the mapping table 219.

The mapping table 219 may be stored in a buffer inside the device security manager 215. Alternatively, the mapping table 219 may be stored in a buffer (e.g., buffer memory 216) outside the device security manager 215.

The access information Acc_Inf according to each of the tenants (e.g., VM 1 to VM N, where N is a natural number greater than 1) is stored in the mapping table 219.

For example, the first access information Acc_Inf 1 on the first tenant VM 1 may include a first host memory address HMA 1, a first namespace identifier NSID 1, a first logic block address LBA 1, a first buffer address 1 and a first security key Key 1, which correspond to the first host memory region 106. The second access information Acc_Inf 2 on the second tenant VM 2 may include a second host memory address HMA 2, a second namespace identifier NSID 2, a second logic block address LBA 2, a second buffer address Buffer address 2 and a second security key Key 2, which correspond to the second host memory region 108. In addition, the Nth access information Acc_Inf N on the Nth tenant VM N may include an Nth host memory address HMA N, an Nth namespace identifier NSID N, an Nth logic block address LBA N, an Nth buffer address Buffer address N and an Nth security key Key N, which correspond to the Nth host memory region HMR N.

Hereinafter, the first access information Acc_Inf 1 is described, and its description may be applied to the other access information (for example, second access information Acc_Inf 2 to Nth access information Acc_Inf N).

The first buffer address Buffer address 1 may be a memory address corresponding to the first buffer region BR 1 included in the first device security zone DSZ 1.

The device security manager 215 that has written the plurality of tenant-specific access information Acc_Inf received from the host security manager 130 in the mapping table 219 determines whether to approve an access request from the host device 100 by using the mapping table 219.

In more detail, when attempting to access the storage device 200, the host controller 110 sends the access information, which includes information of a tenant who attempts to access the storage device 200, to the storage device 200. At this time, a host memory address, a namespace identifier, a buffer address and a logic block address for each tenant may be included in the information of the tenant.

That is, the device security manager 215 of the storage device 200 extracts the host memory address, the namespace identifier, the buffer address and the logic block address in the access information received from the host controller 110, compares the extracted ones with those stored in the mapping table 219, and approves access from the host device 100 to the storage device 200 when it is determined that the extracted ones are the same as those stored in the mapping table 219.

For example, if the first tenant VM 1 reads the first tenant data stored in the first buffer region BR 1 of the storage device 200. At this time, the host controller 110 sends the first access information Acc_Inf 1 related to the first tenant VM 1 to the storage device 200. Afterwards, when it is determined that the host memory address, the namespace identifier, the buffer address and the logic block address, which exist in the first access information Acc_Inf 1, are the same as the first host memory address HMA 1, the first namespace identifier NSID 1, the first buffer address Buffer address 1 and the first logic block address LBA 1, which are stored in the mapping table 219, the device security manager 215 in the storage device 200 determines that the corresponding operation is not the security attack performed from the first tenant VM 1, and approves the read operation of the first tenant VM 1. Afterwards, the device security manager 215 may decode the first tenant data stored in the first buffer region BR 1 by using the first security key Key 1 to transmit the decoded first tenant data to the first host memory region 106 corresponding to the first host memory address HMA 1 of the host memory 120. The first tenant VM 1 may complete the read operation for the first tenant data transmitted to the first host memory region 106.

For another example, if the first tenant VM 1 writes the first tenant data in the first buffer region BR 1 of the storage device 200. At this time, the host controller 110 sends the first access information Acc_Inf 1 related to the first tenant VM 1 and the first tenant data to the storage device 200.

Afterwards, when it is determined that the host memory address, the namespace identifier, the buffer address and the logic block address, which exist in the first access information Acc_Inf 1, are the same as the first host memory address HMA 1, the first namespace identifier NSID 1, the first buffer address Buffer address 1 and the first logic block address LBA 1, which are stored in the mapping table 219, the device security manager 215 in the storage device 200 determines that the corresponding operation is not the security attack performed from the first tenant VM 1, and approves the write operation of the first tenant VM 1. Afterwards, the device security manager 215 may encrypt and write the first tenant data in the first buffer region BR 1 by using the first security key Key 1. The first tenant VM 1 may complete the write operation for the first tenant data.

That is, as described above, the storage device 200 according to some example embodiments extracts the host memory address, the namespace identifier, the buffer address and the logic block address, which are included in the access information Acc_Inf received from the host device 100, compares the extracted ones with information of the mapping table 219 in which information on each of the plurality of tenants VM 1 to VM N is stored, to determine whether the extracted ones are the same as the information of the mapping table 219, and then determines whether to approve the access from the host device 100, thereby ensuring isolation of data for each of the plurality of tenants VM 1 to VM N and improving security.

For example, the first tenant VM 1 may access only the first tenant data of the first buffer address Buffer address 1, which is stored in the first device security zone DSZ 1, through the first security route SR1, and the second tenant VM 2 may access only the second tenant data of the second buffer address Buffer address 2, which is stored in the second device security zone DSZ 2, through the second security route SR2.

Figure 11:
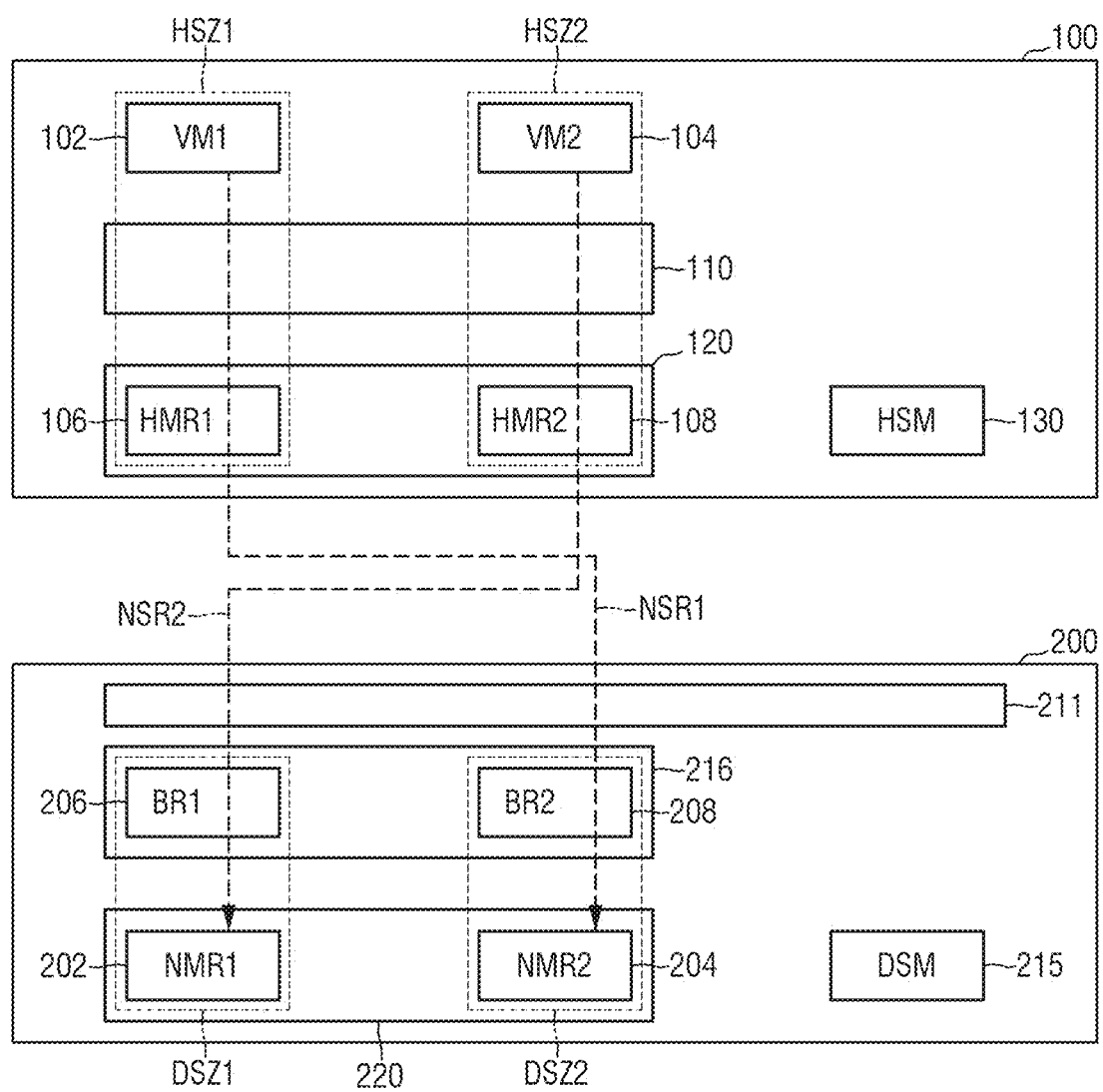
FIG. 11 is a block diagram illustrating other example of a security attack of a host device against a storage device.

FIG. 11 is a block diagram illustrating other example of a security attack of a host device against a storage device.

Referring to FIG. 11, as a security attack from the first tenant VM 1 is attempted, the first tenant VM 1 may attempt to access data of the second non-volatile memory region NMR 2 and the second buffer region BR 2 of the second device security zone DSZ 2 through the first non-security route NSR 1. Alternatively, as a security attack from the second tenant VM 2 is attempted, the second tenant VM 2 may attempt to access data of the first non-volatile memory region NMR 1 and the first buffer region BR 1 of the first device security zone DSZ 1 through the second non-security route NSR 2.

Therefore, isolation for each of the plurality of tenants and protection of data for the non-volatile memory 220 and the buffer memory 216 of each of the plurality of tenants is required or desired. Through the operation of the storage system according to some example embodiments, isolation of each of the plurality of tenants and protection of the data for the non-volatile memory 220 and the buffer memory 216 of each of the plurality of tenants may be performed and are described in detail below.

For reference, a repeated description of the aforementioned description is omitted, and the following description is based on a difference from the aforementioned description.

Figure 12:
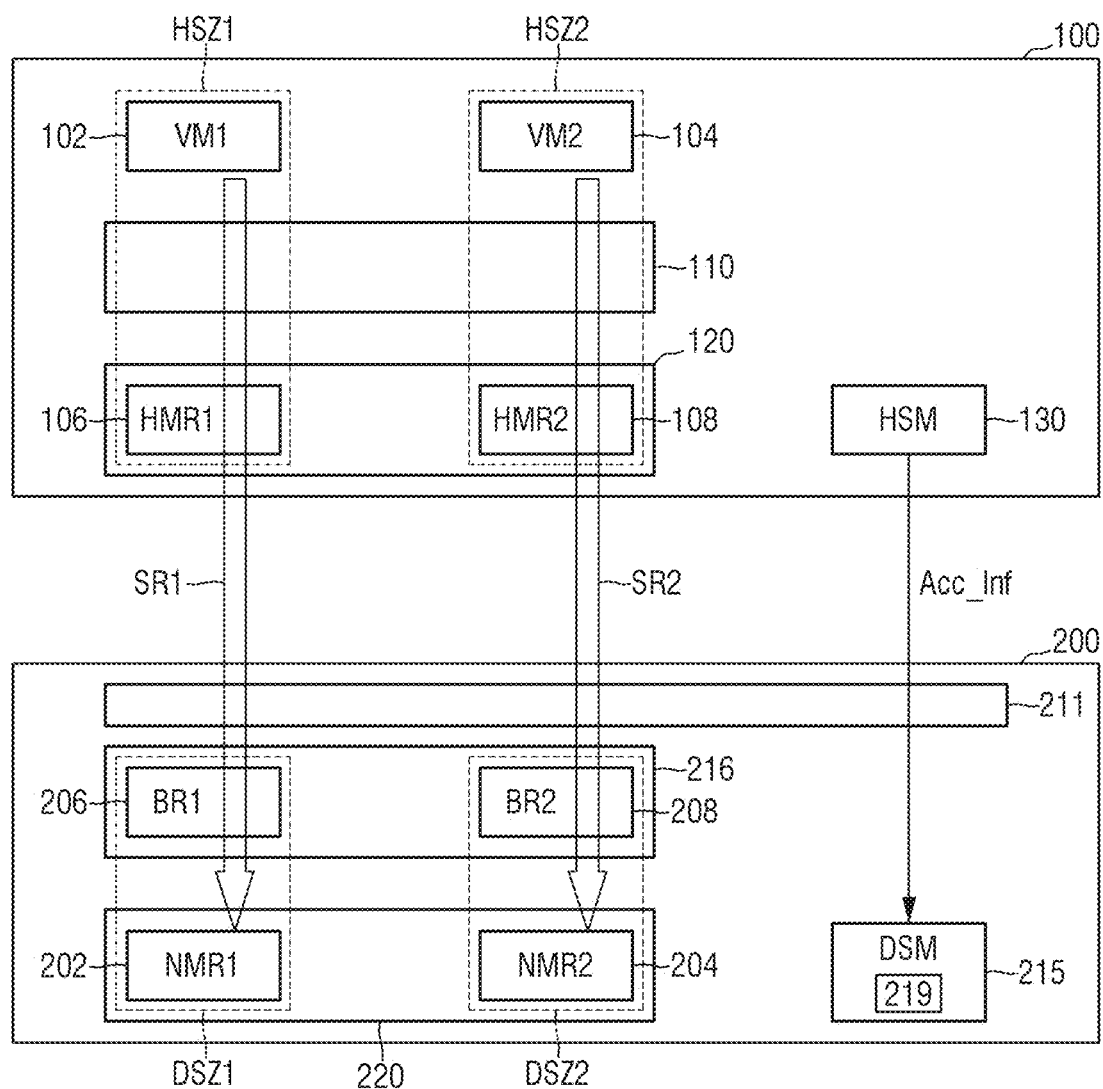
FIGS. 12 and 13 are example block diagrams illustrating another operation of a storage system according to some example embodiments.
Figure 13:
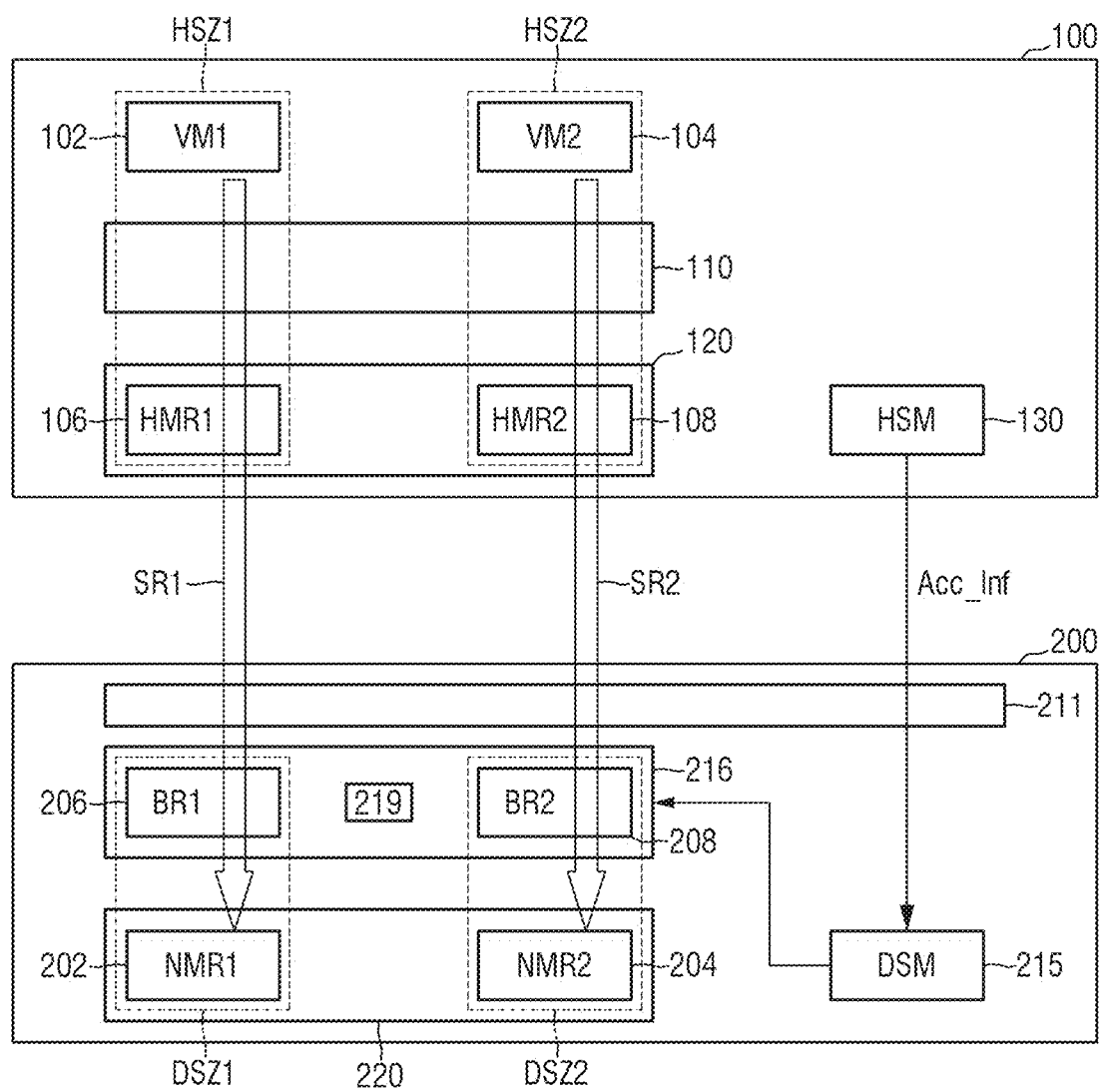

FIGS. 12 and 13 are example block diagrams illustrating another operation of a storage system according to some example embodiments.

Referring to FIGS. 10, 12 and 13, for example, if the first tenant VM 1 reads the first tenant data stored in the first buffer region BR 1 and the first non-volatile memory region NMR 1 of the storage device 200. At this time, the host controller 110 sends the first access information Acc_Inf 1 related to the first tenant VM 1 to the storage device 200. Afterwards, when it is determined that the host memory address, the namespace identifier, the buffer address and the logic block address, which exist in the first access information Acc_Inf 1, are the same as the first host memory address HMA 1, the first namespace identifier NSID 1, the first buffer address Buffer address 1 and the first logic block address LBA 1, which are stored in the mapping table 219, the device security manager 215 in the storage device 200 determines that the corresponding operation is not the security attack performed from the first tenant VM 1, and approves the read operation of the first tenant VM 1. Afterwards, the device security manager 215 may decode the first tenant data stored in the first buffer region BR 1 and the first non-volatile memory region NMR 1 by using the first security key Key 1 to transmit the decoded first tenant data to the first host memory region 106 corresponding to the first host memory address HMA 1 of the host memory 120. The first tenant VM 1 may complete the read operation for the first tenant data transmitted to the first host memory region 106.

For another example, if the first tenant VM 1 writes the first tenant data in the first buffer region BR 1 and the first non-volatile memory region NMR 1 of the storage device 200. At this time, the host controller 110 sends the first access information Acc_Inf 1 related to the first tenant VM 1 and the first tenant data to the storage device 200. Afterwards, when it is determined that the host memory address, the namespace identifier, the buffer address and the logic block address, which exist in the first access information Acc_Inf 1, are the same as the first host memory address HMA 1, the first namespace identifier NSID 1, the first buffer address Buffer address 1 and the first logic block address LBA 1, which are stored in the mapping table 219, the device security manager 215 in the storage device 200 determines that the corresponding operation is not the security attack performed from the first tenant VM 1, and approves the write operation of the first tenant VM 1. Afterwards, the device security manager 215 may encrypt and write the first tenant data in the first buffer region BR 1 and the first non-volatile memory region NMR 1 by using the first security key Key 1. The first tenant VM 1 may complete the write operation for the first tenant data.

That is, as described above, the storage device 200 according to some example embodiments extracts the host memory address, the namespace identifier, the buffer address and the logic block address, which are included in the access information Acc_Inf received from the host device 100, compares the extracted ones with information of the mapping table 219 in which information on each of the plurality of tenants VM 1 to VM N is stored, to determine whether the extracted ones are the same as the information of the mapping table 219, and then determines whether to approve the access from the host device 100, thereby ensuring isolation of data for each of the plurality of tenants VM 1 to VM N and improving security.

For example, the first tenant VM 1 may access only the first tenant data of the first buffer address Buffer address 1 and the first non-volatile memory region NMR 1, which is stored in the first device security zone DSZ 1, through the first security route SR1, and the second tenant VM 2 may access only the second tenant data of the second buffer address Buffer address 2 and the second non-volatile memory region NMR 2, which is stored in the second device security zone DSZ 2, through the second security route SR2.

Figure 14:
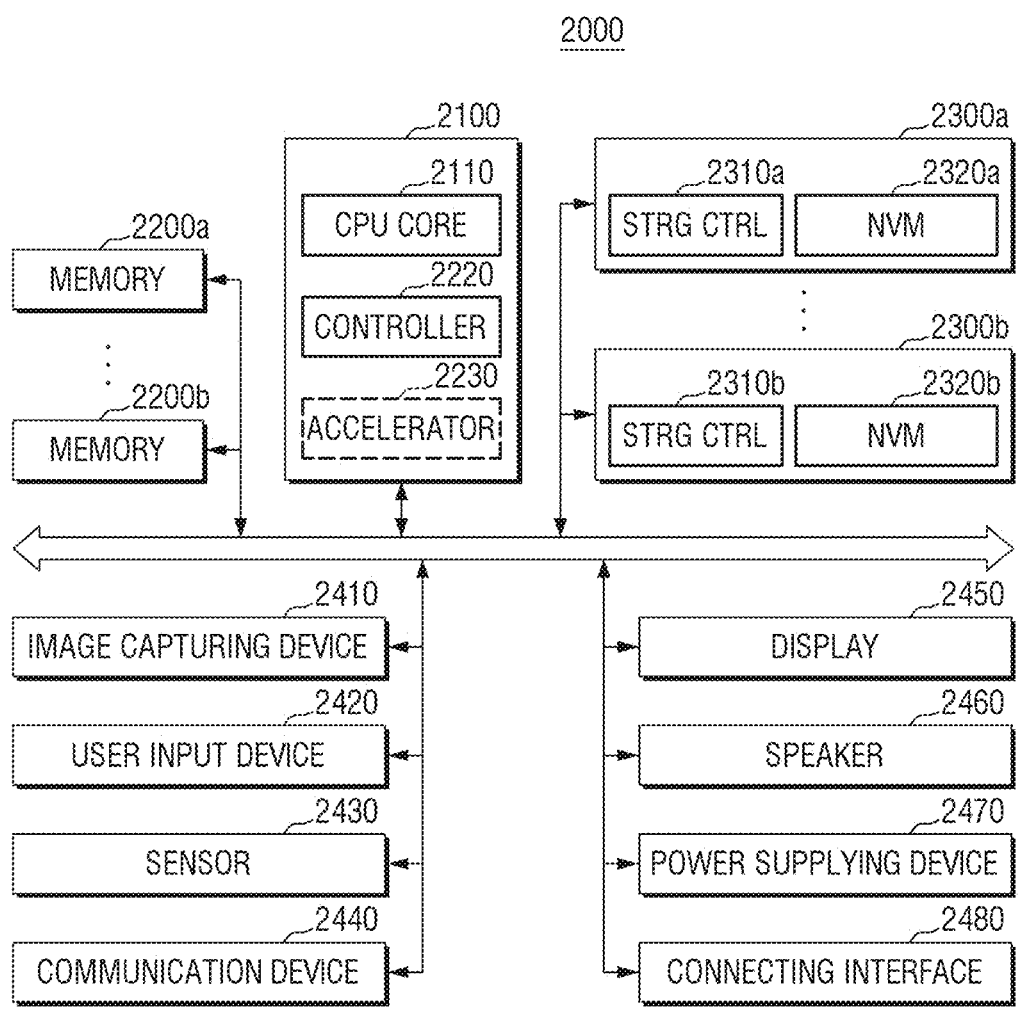
FIG. 14 is an example block diagram illustrating another storage system according to some example embodiments.

FIG. 14 is an example block diagram illustrating another storage system according to some example embodiments.

Referring to FIG. 14, a storage system 2000 according to some example embodiments may be a mobile system such as a mobile phone, a smart phone, a tablet personal computer (PC), a wearable device, a healthcare device or an Internet of things (IoT) device. However, the storage system 2000 of FIG. 14 is not necessarily limited to the mobile system, but may be a personal computer, a laptop computer, a server, a media player or an automotive device such as a navigator.

Referring still to FIG. 14, the storage system 2000 may include a main processor 2100, memories 2200a and 2200b, and storage devices 2300a and 2300b. The storage system 2000 may further include one or more of an image capturing device 2410, a tenant input device 2420, a sensor 2430, a communication device 2440, a display 2450, a speaker 2460, a power supplying device 2470, and a connecting interface 2480.

The main processor 2100 may control the overall operation of the storage system 2000, more specifically the operation of other components that constitute the system 2000. The main processor 2100 may be implemented as a general purpose processor, a dedicated processor or an application processor.

The main processor 2100 may include one or more CPU cores 2110 and may further include a controller 2120 for controlling the memories 2200a and 2200b and/or the storage devices 2300a and 2300b. In accordance with an embodiment, the main processor 2100 may further include an accelerator 2130, which is a dedicated circuit for high-speed data computation such as artificial intelligence (AI) data computation. The accelerator 2130 may include a graphics processing unit (GPU), a neural processing unit (NPU) and/or a data processing unit (DPU), and may be implemented as a separate chip physically independent from the other components of the main processor 2100.

The memories 2200a and 2200b may be used as main memory devices of the system 2000, and may include a volatile memory such as SRAM and/or DRAM, but may also include a non-volatile memory such as flash memory, PRAM, and/or RRAM. The memories 2200a and 2200b may be implemented in the same package as the main processor 2100.

The storage devices 2300a and 2300b may be the storage devices 200 according to some example embodiments, which are described above with reference to FIGS. 1 to 13.

The storage devices 2300a and 2300b may serve as non-volatile storage devices that store data regardless of power supply and may have a storage capacity relatively greater than that of the memories 2200a and 2200b. The storage devices 2300a and 2300b may include storage controllers 2310a and 2310b and non-volatile memories (NVM) 2320a and 2320b for storing data under the control of the storage controllers 2310a and 2310b. The non-volatile memories 2320a and 2320b may include a flash memory of a two-dimensional (2D) structure or a three-dimensional (3D) vertical NAND (V-NAND) structure but may also include other types of non-volatile memories such as PRAM and/or RRAM.

The storage devices 2300a and 2300b may be included in the system 2000 in a state that they are physically separated from the main processor 2100 and may be implemented in the same package as the main processor 2100. In addition, the storage devices 2300a and 2300b may have a type such as a solid state device (SSD) or a memory card, and thus may detachably be coupled to the other components of the system 2000 through an interface such as the connecting interface 2480 that is described later. The storage devices 2300a and 2300b may be devices to which the standard regulation such as Universal Flash Storage (UFS), embedded multi-media card (eMMC) or non-volatile memory express (NVMe) is applied, but are not limited thereto.

The image capturing device 2410 may capture a still image or video, and may be a camera, a camcorder, and/or a webcam.

The tenant input device 2420 may receive various types of data input from a tenant of the system 2000, and may be a touch pad, a keypad, a keyboard, a mouse, and/or a microphone.

The sensor 2430 may sense various types of physical quantities that may be acquired from the outside of the system 2000 and convert the sensed physical quantity to an electrical signal. The sensor 2430 may be a temperature sensor, a pressure sensor, an illuminance sensor, a position sensor, an acceleration sensor, a biosensor, and/or a gyroscope sensor.

The communication device 2440 may perform transmission and reception of signals between other devices external to the system 2000 in accordance with various communication protocols. Such a communication device 2440 may be implemented using an antenna, a transceiver, and/or a modem.

The display 2450 and the speaker 2460 may serve as output devices that respectively output visual information and auditory information to the tenant of the system 2000.

The power supplying device 2470 may appropriately convert power supplied from an external power source and/or a battery (not shown) embedded in the system 2000 to supply the power to each component of the system 2000.

The connecting interface 2480 may be provided to connect the system 2000 with an external device connected to the system 2000 to exchange data with the system 2000. The connecting interface 2480 may be implemented in a way of various interfaces such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), secure digital (SD) card, multi-media card (MMC), eMMC, UFS, embedded Universal Flash Storage (eUFS), and compact flash (CF) card.

Figure 15:
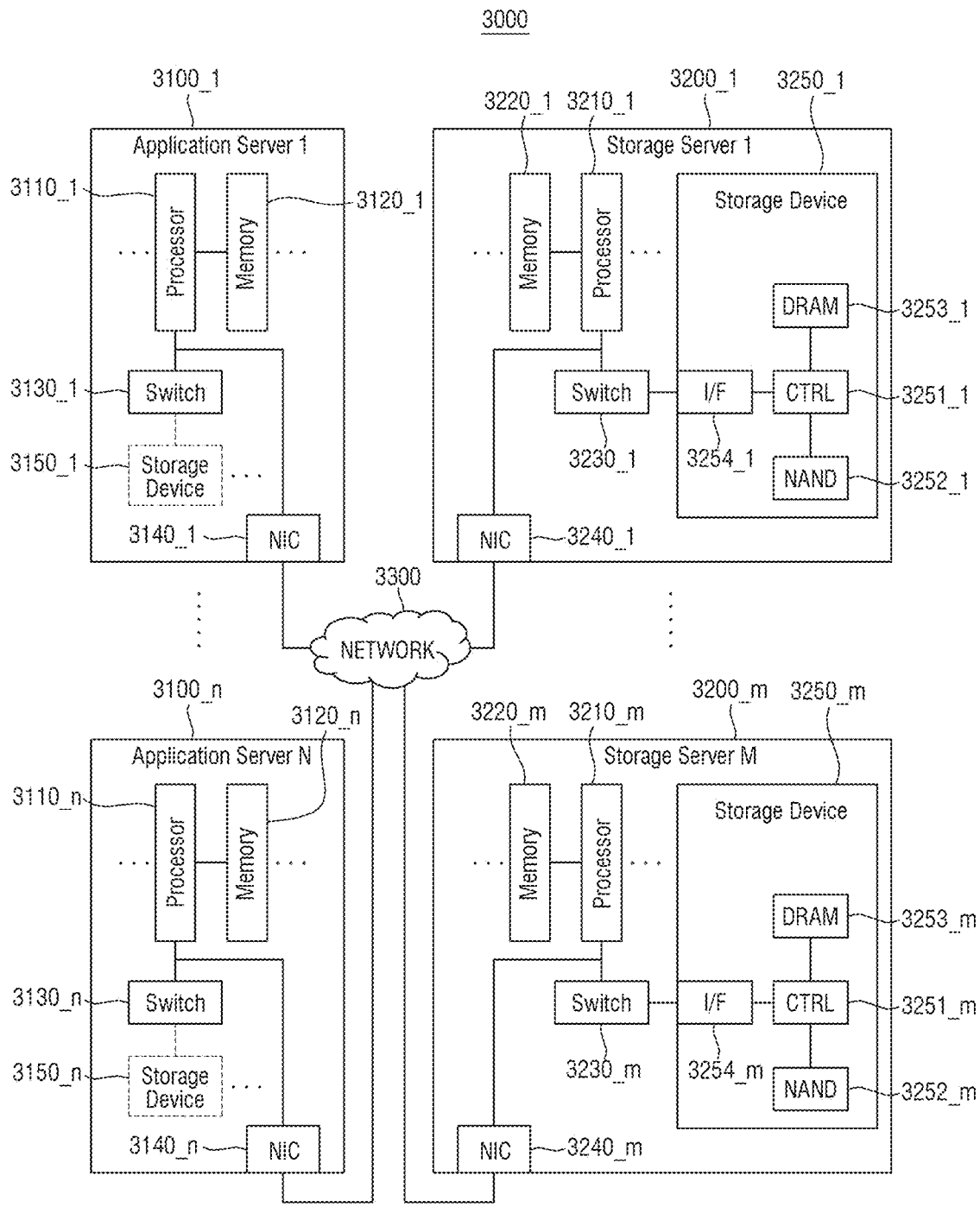
FIG. 15 is an example block diagram illustrating a data center to which a storage device according to some example embodiments is applied.

FIG. 15 is an example block diagram illustrating a data center to which a storage device according to some example embodiments is applied.

Referring to FIG. 15, a data center 3000 is a facility for providing services by collecting various data, and may be referred to as a data storage center. The data center 3000 may be a system for operating a search engine and a database and may be a computing system used in an enterprise such as bank, or a government agency. The data center 3000 may include application servers 3100 to 3100n and storage servers 3200 to 3200m. The number of application servers 3100 to 3100n and the number of storage servers 3200 to 3200m may variously be selected in accordance with embodiments, and the number of application servers 3100 to 3100n and the number of storage servers 3200 to 3200m may be different from each other.

The application server 3100 or the storage server 3200 may include at least one of processors 3110 and 3210 or memories 3120 and 3220. The application server 3100 may also include switch 3130 and a network interconnect (NIC) 3140. The storage server 3200 is described by way of example. The processor 3210 may control the overall operation of the storage server 3200 and may access the memory 3220 to execute a command language and/or data loaded into the memory 3220. The memory 3220 may be a Double Data Rate Synchronous DRAM (DDR SDRAM), a High Bandwidth Memory (HBM), a Hybrid Memory Cube (HMC), a Dual In-line Memory Module (DIMM), an Optane DIMM and/or a Non-Volatile DIMM (NVMDIMM). In accordance with embodiments, the number of processors 3210 and the number of memories 3220, which are included in the storage server 3200, may variously be selected. In one embodiment, the processor 3210 and the memory 3220 may provide a processor-memory pair. In one embodiment, the number of processors 3210 and the number of memories 3220 may be different from each other. The processor 3210 may include a single core processor or a multi-core processor. The description of the storage server 3200 may similarly be applied to the application server 3100. In accordance with an embodiment, the application server 3100 may not include a storage device 3150. The storage server 3200 may include at least one storage device 3250. The number of storage devices 3250 included in the storage server 3200 may variously be selected in accordance with embodiments.

The application servers 3100 to 3100n may perform communication with the storage servers 3200 to 3200m through a network 3300. The network 3300 may be implemented using a Fibre Channel (FC) or Ethernet. In this case, the FC is a medium used for data transmission of relatively high speed, and an optical switch that provides high performance/high availability may be used as the FC. The storage servers 3200 to 3200m may be provided as file storages, block storages or object storages in accordance with an access scheme of the network 3300.

In one embodiment, the network 3300 may be a storage-only network such as a storage area network (SAN). For example, the SAN may be an FC-SAN implemented using an FC network in accordance with an FC protocol (FCP). For another example, the SAN may be an IP-SAN implemented using a TCP/IP network in accordance with an SCSI over TCP/IP or Internet SCSI (iSCSI) protocol. In another embodiment, the network 3300 may be a general network such as a TCP/IP network. For example, the network 3300 may be implemented in accordance with a protocol such as FC over Ethernet (FCoE), Network Attached Storage (NAS), and NVMe over Fabrics (NVMe-oF).

The following description is based on the application server 3100 and the storage server 3200. The description of the application server 3100 may also be applied to the other application server 3100n, and the description of the storage server 3200 may also be applied to the other storage server 3200m.

The application server 3100 may store data requested to be stored from a tenant or client in one of the storage servers 3200 to 3200m through the network 3300. In addition, the application server 3100 may acquire data requested to be read from the tenant or client from one of the storage servers 3200 to 3200m through the network 3300. For example, the application server 3100 may be implemented as a web server or a database management system (DBMS).

The application server 3100 may access the memory 3120n or the storage device 3150n, which is included in the other application server 3100n, through the network 3300, or may access the memories 3220 to 3220m or the storage devices 3250 to 3250m, which are included in the storage servers 3200 to 3200m, through the network 3300. As a result, the application server 3100 may perform various operations with respect to the data stored in the application servers 3100 to 3100n and/or the storage servers 3200 to 3200m. For example, the application server 3100 may execute a command language for moving or copying data between the application servers 3100 to 3100n and/or the storage servers 3200 to 3200m. At this time, the data may move to the memories 3120 to 3120n of the application servers 3100 to 3100n via the memories 3220 to 3220m of the storage servers 3200 to 3200m from the storage devices 3250 to 3250m of the storage servers 3200 to 3200m, or may directly move to the memories 3120 to 3120n of the application servers 3100 to 3100n. The data moving through the network 3300 may be data encrypted for security or privacy. The switch 3130 may selectively connect the processor 3110 with the storage device 3150 under the control of the processor 3110 or selectively connect the NIC 3140 with the storage device 3150.

The storage devices 3250 to 3250m may be the storage devices 200 according to some example embodiments, which are described above with reference to FIGS. 1 to 13.

The storage server 3200 is described by way of example. An interface 3254 may provide a physical connection between the processor 3210 and a controller 3251 and a physical connection between a network interconnect (NIC) 3240 and the controller 3251. For example, the interface 3254 may be implemented in a direct attached storage (DAS) scheme that directly connects the storage device 3250 to a dedicated cable. Also, for example, the interface 3254 may be implemented in a way of various interfaces such as Advanced Technology Attachment (ATA), Serial ATA (SATA), external SATA (e-SATA), Small Computer Small Interface (SCSI), Serial Attached SCSI (SAS), Peripheral Component Interconnection (PCI), PCI express (PCIe), NVM express (NVMe), IEEE 1394, universal serial bus (USB), secure digital (SD) card, multi-media card (MMC), embedded multi-media card (eMMC), Universal Flash Storage (UFS), embedded Universal Flash Storage (eUFS), and/or compact flash (CF) card.

The storage server 3200 may further include a switch 3230 and an NIC 3240. The switch 3230 may selectively connect the processor 3210 with the storage device 3250 under the control of the processor 3210 or selectively connect the NIC 3240 with the storage device 3250.

In one embodiment, the NIC 3240 may include a network interface card, a network adapter, and the like. The NIC 3240 may be connected to the network 3300 by a wired interface, a wireless interface, a Bluetooth interface, an optical interface, and the like. The NIC 3240 may include an internal memory, a digital signal processor (DSP), a host bus interface, and the like, and may be connected to the processor 3210 and/or the switch 3230 through the host bus interface. The host bus interface may be implemented as one of the above-described examples of the interface 3254. In one embodiment, the NIC 3240 may be integrated with at least one of the processor 3210, the switch 3230 or the storage device 3250.

In the storage servers 3200 to 3200m or the application servers 3100 to 3100n, the processor may send commands to the storage devices 3150 to 3150n and 3250 to 3250m or the memories 3120 to 3120n and 3220 to 3220m to program or read data. At this time, the data may be error-corrected data through an Error Correction Code (ECC) engine. The data may be data subjected to data bus translation (DBI) or data masking (DM) and may include cyclic redundancy code (CRC) information. The data may be data encrypted for security or privacy.

The storage devices 3150 to 3150n and 3250 to 3250m may transmit a control signal and a command/address signal to the NAND flash memory devices 3252 to 3252m in response to a read command received from the processor. Therefore, when reading data from the NAND flash memory devices 3252 to 3252m, a read enable (RE) signal may be input as a data output control signal to output the data to a DQ bus. A data strobe DQS may be generated using the RE signal. The command and address signal may be latched into a page buffer in accordance with a rising edge or a falling edge of a write enable (WE) signal.

The controller 3251 may generally control the operation of the storage device 3250. In one embodiment, the controller 3251 may include a static random access memory (SRAM). The controller 3251 may write data in the NAND flash 3252 in response to a write command or read the data from the NAND flash 3252 in response to a read command. For example, the write command and/or the read command may be provided from the processor 3210 in the storage server 3200, the processor 3210m in another storage server 3200m or the processors 3110 and 3110n in the application servers 3100 and 3100n. The DRAM 3253 may temporarily store (buffer) the data to be written in the NAND flash 3252 or the data read from the NAND flash 3252. In addition, the DRAM 3253 may store metadata. In this case, the metadata may be tenant data or data generated by the controller 3251 to manage the NAND flash 3252. The storage device 3250 may include a secure element (SE) for security or privacy.

Additionally, the host controller 110, host security manager 130, device security manager 215, error correction code engine 217, encryption/decryption engine 218, CPU core 2110, controller 2220, accelerator 2230, storage controllers 2310a, 2310b, processors 3110, 3210 and controller 3251 and/or the components included therein may include processor(s) and/or processing circuitry such as hardware including logic circuits; a hardware/software combination such as a processor executing software; or a combination thereof. For example, the processor(s) and/or processing circuitry may include, but is not limited to, a central processing unit (CPU), a memory controller, an arithmetic logic unit (ALU), a digital signal processor, a microcomputer, a field programmable gate array (FPGA), and programmable logic unit, a microprocessor, application-specific integrated circuit (ASIC), etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

Although the embodiments according to the technical spirts of the present disclosure have been described with reference to the accompanying drawings, the present disclosure can be manufactured in various forms without being limited to the above-described embodiments, and the person with ordinary skill in the art to which the present disclosure pertains can understand that the present disclosure can be embodied in other specific forms without departing from technical spirits and essential characteristics of the present disclosure. Thus, the above embodiments are to be considered in all respects as illustrative and not restrictive.

Although embodiments of the present disclosure have been described above with reference to the accompanying drawings, it will be understood by those of ordinary skill in the art that the present disclosure is not limited thereto and may be implemented in many different forms without departing from the technical idea or essential features thereof. Therefore, it should be understood that the embodiments set forth herein are merely examples in all respects and not restrictive.

What is claimed is:

1. A storage controller comprising:
    a device security manager configured to
        set a first device security zone to allow a first tenant to access first tenant data stored in a non-volatile memory,
        receive access information from a host device and writing the received access information in a mapping table, wherein the access information includes
            a first host memory address in which the first tenant data is stored in the host device,
            a first namespace identifier for identifying the first tenant data stored in the non-volatile memory,
            a first logic block address corresponding to the first namespace identifier, and
            an encryption key,
        encrypt the first tenant data by using the encryption key, and
        write the encrypted first tenant data in the first device security zone of the non-volatile memory.

2. The storage controller of claim 1, wherein the device security manager is configured to
    decode the first tenant data stored in the non-volatile memory by using the encryption key, and
    transmits the decoded first tenant data to the host device.

3. The storage controller of claim 1, further comprising:
    a buffer memory storing the mapping table.

4. The storage controller of claim 3, wherein
    the device security manager is further configured to
        set the first device security zone in the buffer memory, and
        store the first tenant data in the first device security zone of the buffer memory, and
    the access information further includes a first buffer address in which the first tenant data is stored in the buffer memory.

5. The storage controller of claim 4, wherein the first device security zone includes at least a portion of the buffer memory and at least a portion of the non-volatile memory.

6. The storage controller of claim 1, wherein the device security manager is configured to perform an operation corresponding to an access request received from the host device in response to access information included in the access request and the access information stored in the mapping table being the same as each other.

7. The storage controller of claim 6, wherein the access request includes a read operation for the first tenant data stored in the non-volatile memory and/or a write operation of writing the first tenant data in the non-volatile memory.

8. A storage device comprising:
    a non-volatile memory storing first tenant data; and
    a storage controller configured to
        set a first device security zone in the non-volatile memory to allow a first tenant to access the first tenant data,
        receive access information from a host device and writing the received access information in a mapping table, wherein the access information includes
            a first host memory address in which the first tenant data is stored in the host device,
            a first namespace identifier for identifying the first tenant data stored in the non-volatile memory, and
            a first logic block address corresponding to the first namespace identifier, and send an access acknowledgement to the host device when the host device performs an access request corresponding to the access information stored in the mapping table.

9. The storage device of claim 8, wherein the access information includes an encryption key.

10. The storage device of claim 9, wherein the storage controller is further configured to encrypt the first tenant data by using the encryption key, and write the encrypted first tenant data in the first device security zone of the non-volatile memory.

11. The storage device of claim 9, wherein the storage controller is further configured to decode the first tenant data stored in the non-volatile memory by using the encryption key, and transmit the decoded first tenant data to the host device.

12. The storage device of claim 8, wherein the storage controller further includes a buffer memory storing the mapping table.

13. The storage device of claim 12, wherein the storage controller is further configured to set the first device security zone in the buffer memory, store the first tenant data in the first device security zone of the buffer memory, and the access information includes a first buffer address in which the first tenant data is stored in the buffer memory.

14. The storage device of claim 13, wherein the first device security zone includes at least a portion of the buffer memory and at least a portion of the non-volatile memory.

15. The storage device of claim 8, wherein the storage controller is further configured to perform an operation corresponding to an access request received from the host device in response to access information included in the access request and the access information stored in the mapping table being the same as each other.

16. The storage device of claim 15, wherein the access request includes a read operation for the first tenant data stored in the non-volatile memory and/or a write operation of writing the first tenant data in the non-volatile memory.

17. A host device comprising:

a host memory storing first tenant data;

a host security manager configured to set a first device security zone in the host memory to allow a first tenant to access the first tenant data; and a host controller configured to control access of the first tenant to the host memory, wherein the host security manager is further configured to send access information to a storage device, the access information includes a first host memory address in which the first tenant data is stored in the host memory, a first namespace identifier for identifying the first tenant data stored in a non-volatile memory included in the storage device, and a first logic block address corresponding to the first namespace identifier, and the host controller is further configured to receive an access acknowledgement from the storage device in response to sending an access request corresponding to the access information to the storage device.

18. The host device of claim 17, wherein the access information includes an encryption key.

* * * * *